United States Patent [19]
Miller et al.

[11] Patent Number: 5,765,729
[45] Date of Patent: Jun. 16, 1998

[54] DISPENSER FOR FLOWABLE MATERIALS

[75] Inventors: Kenneth L. Miller, Carmel; David B. Culp, Indianapolis, both of Ind.

[73] Assignee: Liquid Control Corporation, North Canton, Ohio

[21] Appl. No.: 598,380

[22] Filed: Feb. 8, 1996

[51] Int. Cl.$^6$ ........................................... B67D 5/40
[52] U.S. Cl. ........................................... 222/380; 222/504
[58] Field of Search .................................. 222/333, 335, 222/145.6, 213, 214, 494, 559, 380, 215, 504

[56] References Cited

U.S. PATENT DOCUMENTS

| | | | |
|---|---|---|---|
| 3,312,238 | 4/1967 | Voit, Jr. | 222/504 |
| 4,032,044 | 6/1977 | Flynn et al. | 222/380 |
| 4,974,754 | 12/1990 | Wirz | 222/504 |
| 5,092,492 | 3/1992 | Centea | 222/137 |
| 5,350,084 | 9/1994 | Miller et al. | 222/137 |
| 5,458,275 | 10/1995 | Centea et al. | 222/309 |
| 5,467,899 | 11/1995 | Miller | 222/309 |

*Primary Examiner*—Philippe Derakshani
*Attorney, Agent, or Firm*—Sand & Sebolt

[57] ABSTRACT

A dispenser for dispensing flowable materials and in particular anaerobic materials. This dispenser has a material inlet which allows the flowable material to flow into a pump cylinder, and a material passage through which the flowable material exits the pump cylinder. The material is positively displaced from the pump cylinder by a material displacement assembly of the ball-nut follower-type. A flexible plastic diaphragm which has sufficient porosity to permit oxygen to flow therethrough is biased toward a closed position by a pressurized air supply which applies pressurized air against an outside surface of the diaphragm, enabling the diaphragm to function as a one-way shut-off valve. The diaphragm extends across the material passage formed in the pump cylinder and a material outlet through which the material exits the dispenser. The diaphragm is movable between an open position which allows the material to flow through the material outlet and a closed position which prevents material from exiting the pump chamber. The dispenser is relatively free of metal components which can create metal ions that may contact the material, and is free of dead spots within the dispenser, both of which can cause instant curing of the anaerobic material. In a second embodiment the dispenser includes two pump cylinders, with at least one cylinder including the diaphragm check valve, for dispensing two separate materials, one of which contains an anaerobic material into a motionless mixer mounted on the material outlet end of the dispenser.

23 Claims, 4 Drawing Sheets

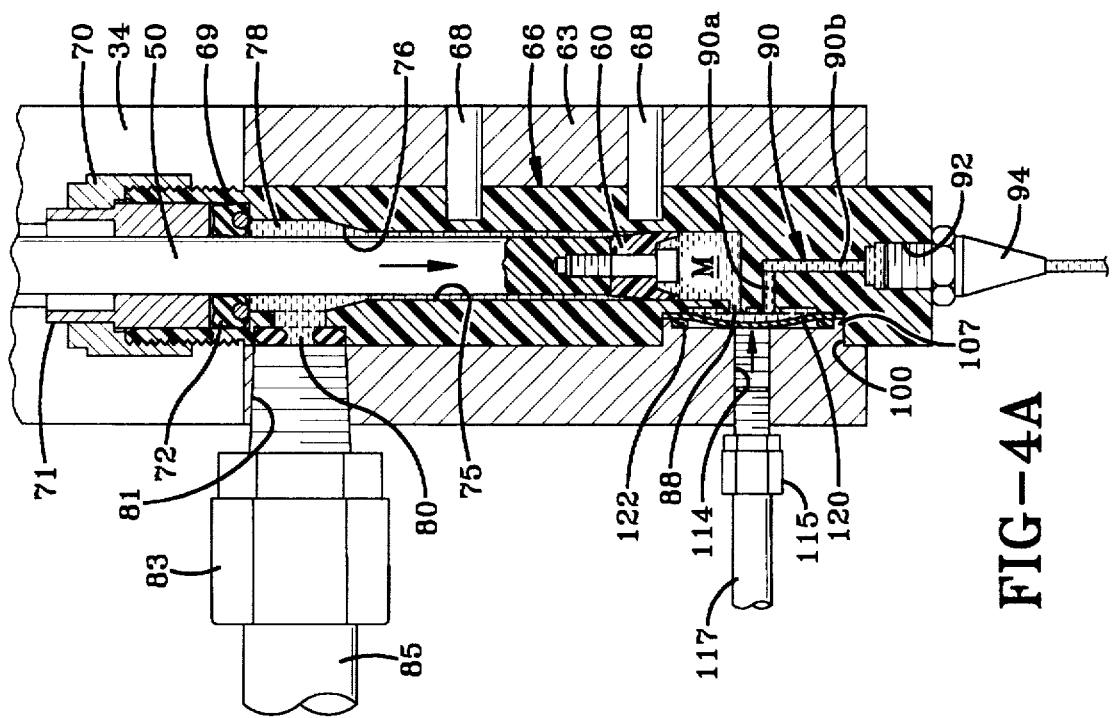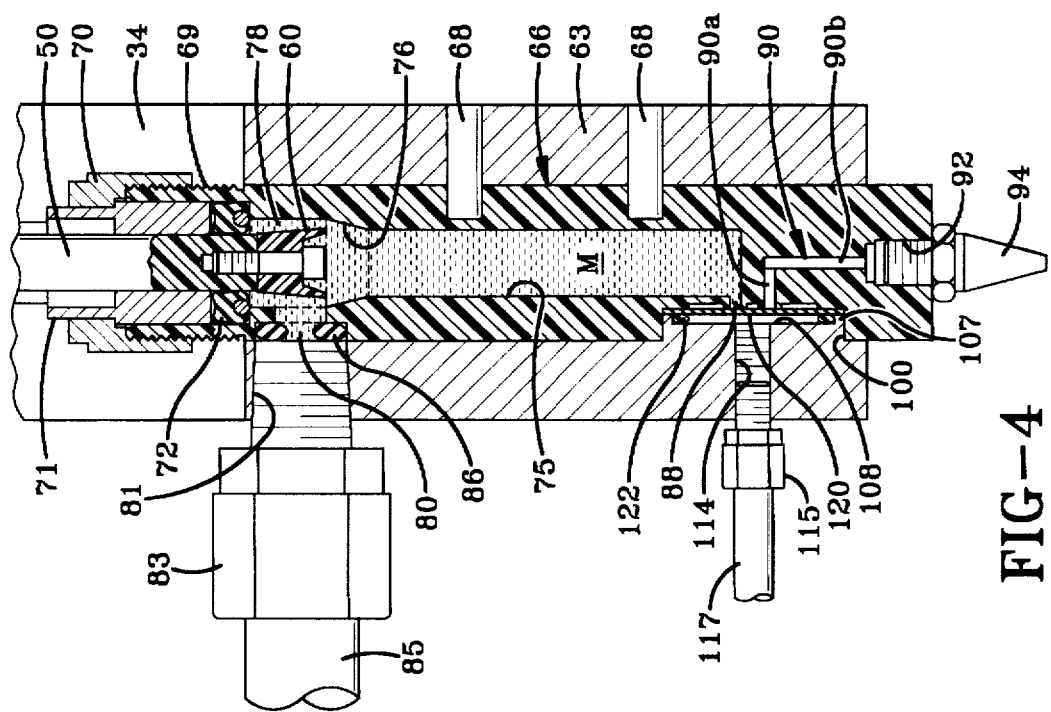

DISPENSER FOR FLOWABLE MATERIALS

BACKGROUND OF THE INVENTION

1. Technical Field

The invention relates to dispensers. More particularly, the invention relates to dispensers for dispensing anaerobic materials. Even more particularly, the invention relates to dispensers which use a flexible diaphragm and pressurized air applied thereon as a one-way shut-off valve, the diaphragm being sufficiently porous to allow oxygen to flow therethrough and prevent the curing of any adjacent anaerobic material.

2. Background Information

Dispensers for flowable materials are used in the manufacturing of an ever-increasing number of products necessary for everyday life. The types of materials dispensed include many movable semi-solid liquids or pastes such as epoxies, polyurethanes, silicones, polyesters, acrylics, polysulfides and phenolics. Many prior art dispensers of these movable liquids or pastes are unable to dispense anaerobic materials or any flowable material which includes anaerobic materials.

It is well known in the art that anaerobic materials require a sufficient supply of oxygen to prevent the curing or hardening thereof and that contact with metal ions, such as produced by the close sliding engagement of metal parts, can also cause instant curing of the anaerobic material. Prior art dispensers typically include a spring biased check valve with a metal spring, for example as shown in U.S. Pat. No. 5,092,492 which discloses a portable dispensing gun for metering, mixing and dispensing the components of a two-component liquid material. This gun includes a usual ball and metal spring check valve for controlling the dispensing of a flowable material from the dispenser.

When anaerobic material contacts the metal spring the metal ions which can be created by movement of the spring can cause instant curing of the material within the check valve. Also, these spring-biased ball-check valves form dead spots which cause unwanted premature curing of the anaerobic material. Once the anaerobic material is trapped within these oxygen deficient dead spots curing will occur within the check valve. Once the anaerobic material has cured and hardened within the check valve, the outlet opening of the dispenser is obstructed and the valve has to be removed from the dispenser and cleaned out.

Therefore, the need exists for an improved dispenser for flowable materials which is relatively free of sliding metal components which can create metal ions that react with anaerobic material, and which does not use a spring biased ball-check valve which forms dead spots, which due to lack of oxygen causes instant curing of the anaerobic material within the dispenser.

SUMMARY OF THE INVENTION

Objectives of the invention include providing a dispenser for flowable materials which uses a flexible plastic diaphragm as a one-way shut-off valve, wherein the diaphragm has sufficient porosity to permit an ample supply of oxygen to flow therethrough preventing curing of adjacent anaerobic material.

Another objective of the invention is to provide such a dispenser which is relatively free of metal components which through sliding contact can create metal ions that come in contact with the anaerobic material and can cause curing of the anaerobic material.

Still another objective of the invention is to provide such a dispenser which is free of any dead spots within the dispenser that lack sufficient oxygen needed by the anaerobic material to prevent premature curing of the anaerobic material.

A further objective of the invention is to provide such a dispenser which can dispense the flowable material in shots as well as a continuous stream.

Still another objective of the invention is to provide such a dispenser which is capable of dispensing either a stream or shot of a single component, or a stream or shot of a two-part compound, which components are subsequently mixed by a motionless mixer mounted on a discharge end of the dispenser.

These objectives and advantages are obtained by the improved dispenser for flowable materials of the present invention, the general nature of which may be stated as including a housing having an inner compartment; a material inlet formed in the housing for supplying the flowable material into said inner compartment; a material passage formed in the housing for allowing the flowable material to exit said inner compartment; a material outlet opening formed in the housing for allowing the flowable material to exit the dispenser; material displacement means for forcing the flowable material out of the inner compartment and through the material outlet opening; a non-metallic flexible diaphragm extending across the material passage and the material outlet and movable between an open position which allows communication between the material passage and the material outlet opening and a closed position which prevents communication between the material passage and the outlet opening; and fluid pressure means for biasing the diaphragm toward the closed position.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 4 is an enlarged sectional view of the lower portion of the dispenser of FIG. 3 containing material to be dispensed therefrom, with the diaphragm valve shown in the closed position;

FIG. 4A is a sectional view similar to FIG. 4 showing the flowable material being dispensed from the dispenser with the diaphragm valve in the open position;

Similar numerals refer to similar parts throughout the drawings.

DESCRIPTION OF THE PREFERRED EMBODIMENTS

Figure 1:
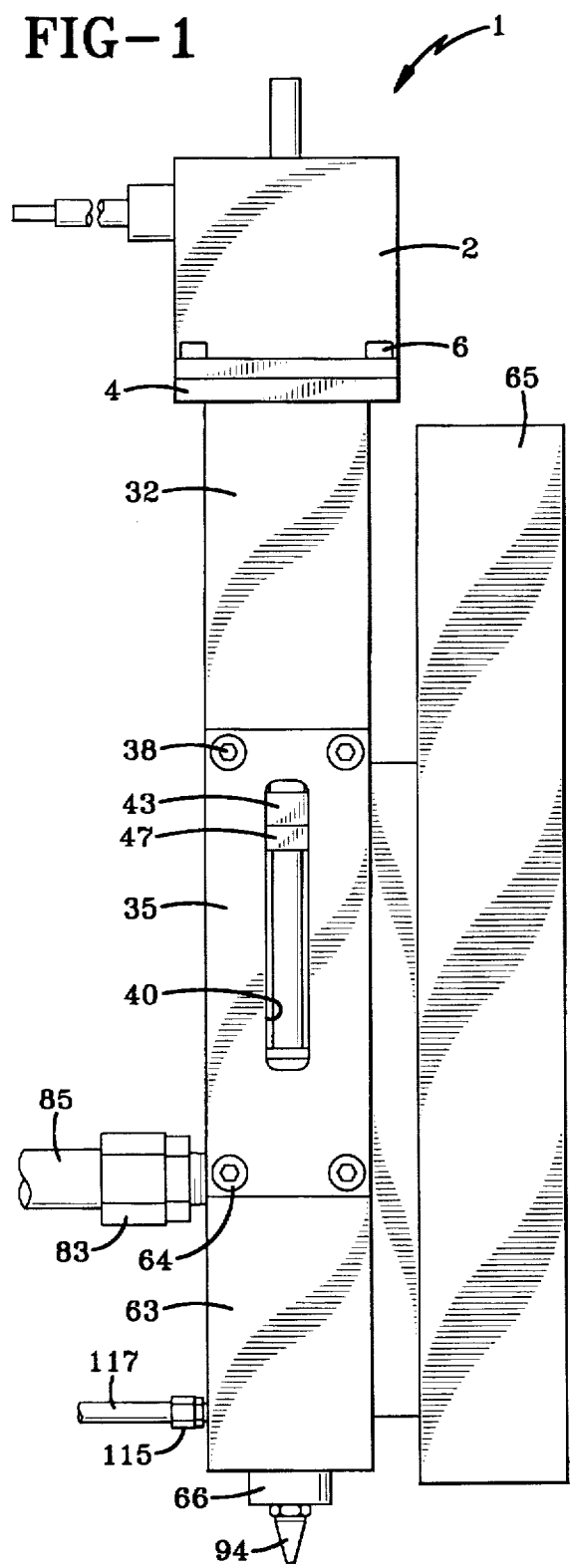
FIG. 1 is a side elevational view of a first embodiment of the dispenser of the present invention mounted on a supporting structure.

The dispenser of the present invention is shown in FIG. 1 and is indicated generally at 1. Dispenser 1 is primarily intended for dispensing flowable materials such as an anaerobic material, or a flowable material containing an anaerobic material as a component thereof. However, dispenser 1 can be used to dispense other types of flowable materials and in particular various resins, pastes, epoxies, etc.

Dispenser 1 includes a programmable electric stepper motor 2 which is attached to a motor mounting plate 4 by a plurality of bolts 6. Stepper motor 2 includes a drive shaft 11 (FIGS. 2 and 3) which drives a usual material displacement assembly indicated generally at 10. Assembly 10 includes a generally cylindrical-shaped motor-to-leadscrew connector 14 attached to drive shaft 11 by a cup point set screw 16. A follower nut 18 is attached to connector 14 by a plurality of roll pins 19 and includes an internally threaded opening 21. A threaded leadscrew 22 extends through threaded opening 21 of follower nut 18 and moves vertically when follower nut 18 is rotated by stepper motor 2. A circular ball bearing 25 is positioned adjacent follower nut 18 to assist the rotation thereof and is contained within the lower portion of a cylindrical bearing retainer sleeve 27. Bearing sleeve 27 extends vertically from a top edge of bearing 25 to motor mounting plate 4.

Material displacement assembly 10 is contained within a cylindrical outer housing 32. A pair of sideplates 34 and 35 are fastened to a bottom of housing 32 by a plurality of screws 38 and form a hollow inner compartment 39. Sideplates 34 and 35 may be curved or flat A slotted opening 40 is formed in each sideplate 34 and 35 (FIG. 1) and extends vertically therein and align radially with one another. A leadscrew connector block 43 extends horizontally across inner compartment 39, and a pair of ends 45 thereof extends through openings 40 of sideplates 34 and 35. The lower end of leadscrew 22 (FIG. 2) couples the leadscrew to connector block 43. Leadscrew connector block 43 is moved vertically by leadscrew 22 and activates upper and lower proximity switches 55 and 56, respectively, which are located near the top and the bottom of slotted opening 40 of sideplate 35 to control the size of the shot being dispensed from dispenser 1.

A metering rod connector block 47 is attached to leadscrew connector block 43 by a plurality of screws 48. A metering rod 50 is coupled to connector block 47 and extends vertically downwardly therefrom through compartment 39. A piston 60 is connected to a bottom end of rod 50 by a screw 61. Sideplates 34 and 35 are connected at their bottom ends to a cylindrical outer chamber housing 63 by a plurality of screws 64.

Figure 2:
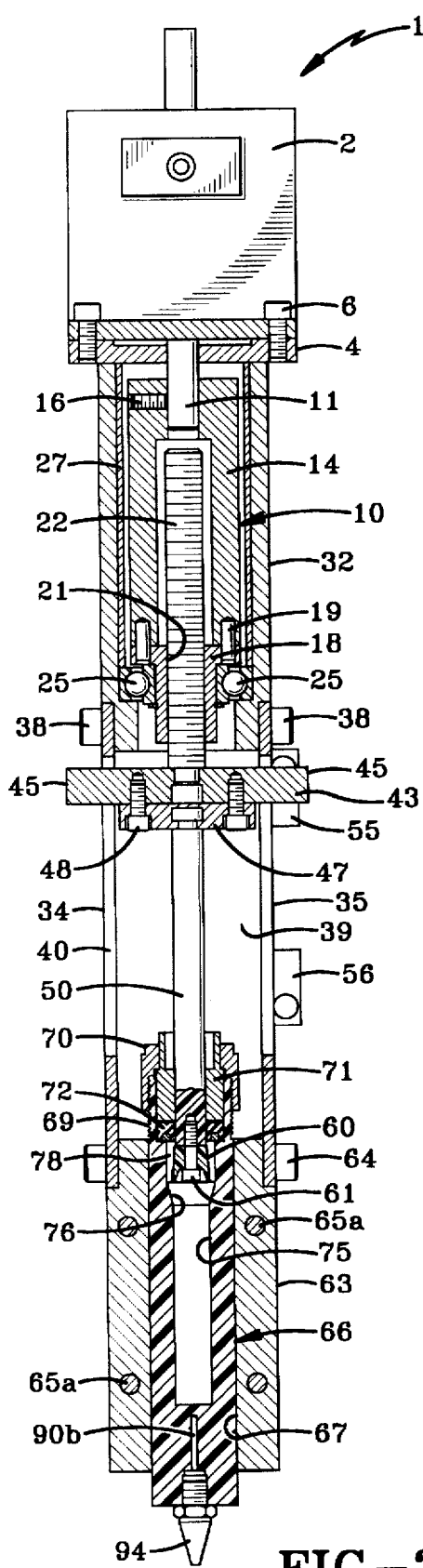
FIG. 2 is a longitudinal sectional view of the dispenser of FIG. 1.
Figure 3:
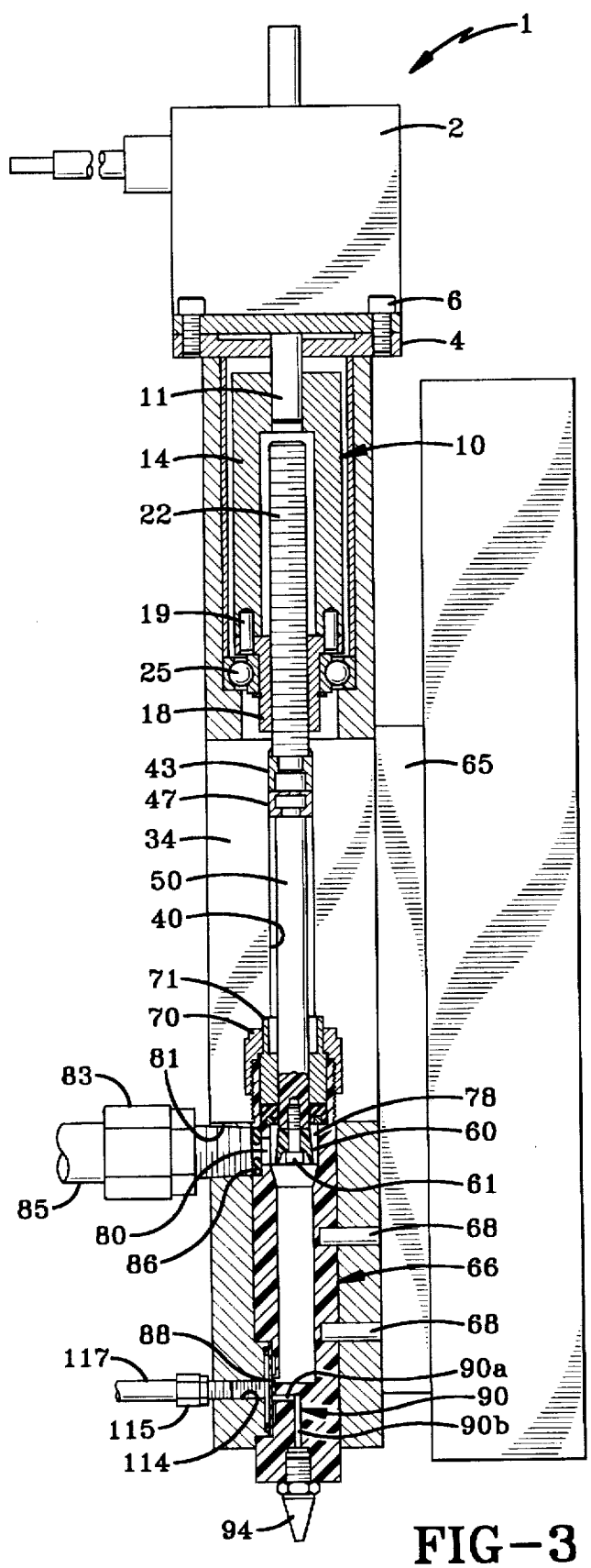
FIG. 3 is a longitudinal sectional view of the dispenser of FIG. 2 rotated 90° therefrom.

A pump cylinder or inner housing, indicated generally at 66 is mounted within a cylindrical bore 67 of lower outer housing 63 and is secured thereto by a plurality of dowel pins 68 (FIG. 3). A mounting plate 65 for vertically mounting dispenser 1 on a support structure is attached to chamber housing 63 by a plurality of screws 65a (FIGS. 2 and 3).

Pump cylinder 66 extends vertically within chamber bore 67 and upwardly into compartment 39. Cylinder 66 includes an externally threaded top portion 69 which receives a nut 70 which secures an oil cup 71 within the top portion of pump cylinder 66. A central bore or chamber 75 is formed in pump cylinder 66 and includes an enlarged tapered upper section 76 which is formed with a stepped shoulder in which is seated a usual seal 72 which also may contain an O-ring.

Metering rod 50 is slidably sealingly engaged with seal 72, and piston 60 is slidably sealing engaged within bore 75. An annular gap 78 (FIGS. 4 and 4A) is formed within upper section 76 of bore 75 when piston 60 is in the fully retracted position of FIGS. 2, 3 and 4.

A material inlet 80 (FIGS. 3–4A) is formed in an upper portion of pump cylinder 66 and communicates with upper section 76 of bore 75. Material inlet 80 communicates with an internally threaded opening 81 formed in chamber housing 63. Threaded opening 81 receives a threaded connector 83 which is attached to the end of a material supply line 85. A usual O-ring 86 seals the end of connector 83 with material inlet 80.

Figure 5:
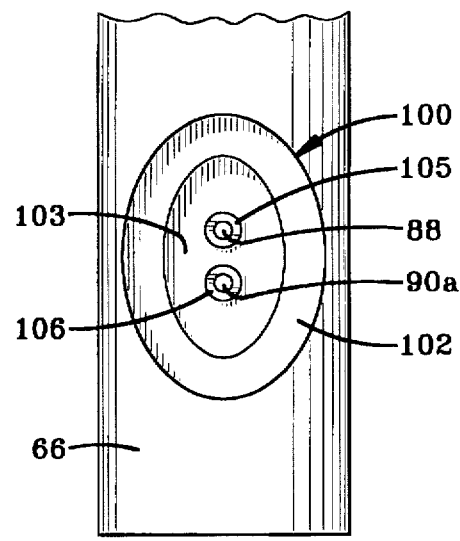
FIG. 5 is a front elevational view of the diaphragm mounting area of the dispenser.
Figure 5A:
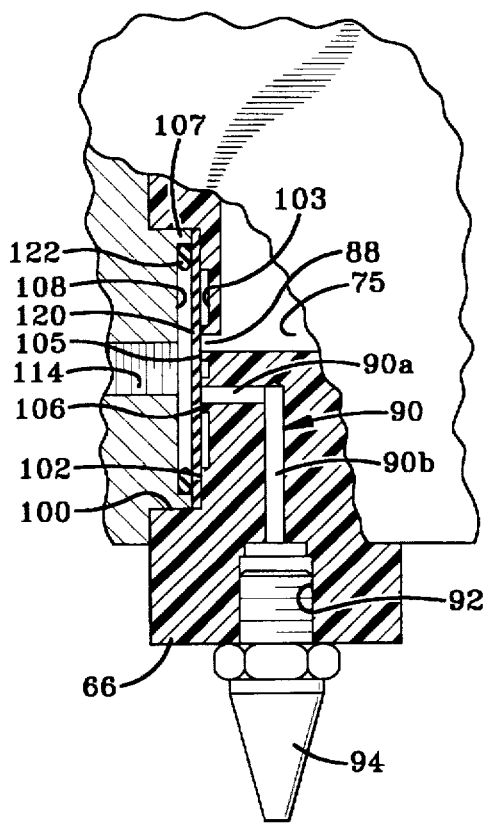
FIG. 5A is a fragmentary view with portions broken away and in section, of the diaphragm valve in closed position.

In accordance with one of the features of the invention, a radially extending material passage or opening 88 is formed in pump cylinder 66 and communicates with the bottom of bore 75 (FIG. 5A). A generally L-shaped material outlet 90 is formed in a bottom of pump cylinder 66 and includes a horizontally radially extending section 90a and a vertically extending section 90b. A bottom portion 92 of material outlet 90 has an enlarged diameter and is internally threaded to receive the threaded end of a nozzle 94 therein.

In further accordance with the invention, a generally oval-shaped cavity 100 (FIGS. 4–5A) is formed in an outer surface of pump cylinder 66. Cavity 100 has an oval-shaped clamping surface 102 (FIGS. 5 and 5A) and a center oval-shaped indent 103. Circular bosses 105 and 106 are formed around the end of opening 88 and material outlet 90a, respectively, within indent 103. Chamber housing 63 includes an oval-shaped projection 107 (FIGS. 3–4A and 5A) which extends inwardly from the inside surface thereof and forms an oval-shaped cavity 108 which communicates with cavity 100 formed in pump cylinder 66. An internally threaded radially extending hole 114 is formed in chamber housing 63 for receiving a threaded end of an air hose connector 115. Connector 115 is attached to a pressurized air supply line 117 which supplies pressurized air into cavity 108.

In accordance with one of the main features of the invention, a flexible diaphragm 120 (FIGS. 3–4A and 5A) is mounted adjacent to and separates cavities 100 and 108 and extends across opening 88 and material outlet 90a. Diaphragm 120 is formed of a usual plastic material, preferably an ultra high molecular weight, such as various types of polyethylene or TEFLON, which has sufficient porosity to permit oxygen to flow therethrough, and in the preferred embodiment has a nominal thickness of approximately 0.010 inches. Diaphragm 120 separates cavities 100 and 108 and is clamped against surface 102 by projection 107. A usual O-ring 122 sits within the stepped outer end of projection 107 to sealingly engage diaphragm 120. Annular bosses 105 and 106 and adjacent portions of indent 103 assist diaphragm 120 in forming an effective material seal against openings 88 and 90a when in the closed position of FIGS. 4 and 5A.

Dispenser 1 operates to dispense a flowable material in the following manner. Drive shaft 11 of stepper motor 2 rotates motor-to-leadscrew connector 14 which in turn rotates follower nut 18. When follower nut 18 rotates, leadscrew 22 will move axially downwardly. Ends 45 of leadscrew connector block 43 move axially within slotted openings 40 of sideplates 34 and 35 which prevent the rotation of leadscrew connector block 43 and leadscrew 22. Thus, metering rod connector block 47 and metering rod 50 are moved downwardly by leadscrew connector block 43 when drive shaft 11 is rotated by motor 2.

A flowable material "M" (FIGS. 4 and 5) is forced through material inlet 80 by a usual pressurized material supply source and into upper section 76 of bore 75. Seal 72 prevents the material from flowing upwardly into compartment 39, and thus the material is forced to flow between gap 78 and into bore 75. Pressurized air supply line 117 supplies pressurized air for example 40 p.s.i., against the outer surface of diaphragm 120 causing the diaphragm to block opening 88 and prevent the material from flowing out of the pump chamber and into oval-shaped cavity 100.

When stepper motor 2 drives meter rod 50 downwardly, piston 60 positively displaces the loaded material contained within bore 75 with enough force to overcome the air pressure exerted against diaphragm 120. Material "M" applies a pressure against the inside surface of the diaphragm which is greater than the pressurized air supplied by air line 117 against the outside surface of the diaphragm causing flexible diaphragm 120 to bow outwardly, as shown in FIG. 4A, to allow the material to flow into the area between side wall 76 and bowed diaphragm 120. When the diaphragm is in the open position of FIG. 4A, the material travels along its path of least resistance and is forced through material outlet 90 and dispensed from nozzle 94.

When leadscrew connector block reaches the bottom of slotted openings 40 it will actuate lower proximity switch 56 which reverses the direction of stepper motor 2 and retracts piston 60 from bore 75. The pressure against the inside surface of diaphragm 120 from the material is relieved and the pressure on the outside of the diaphragm from pressurized air supply line 117 is again greater than the pressure on the inside surface of the diaphragm. When this condition exists diaphragm 120 will seal opening 88 and prevent additional material from exiting bore 75. Any anaerobic material trapped within cavity 100 will not cure since the porosity of diaphragm 120 permits oxygen to pass therethrough.

Figure 7:
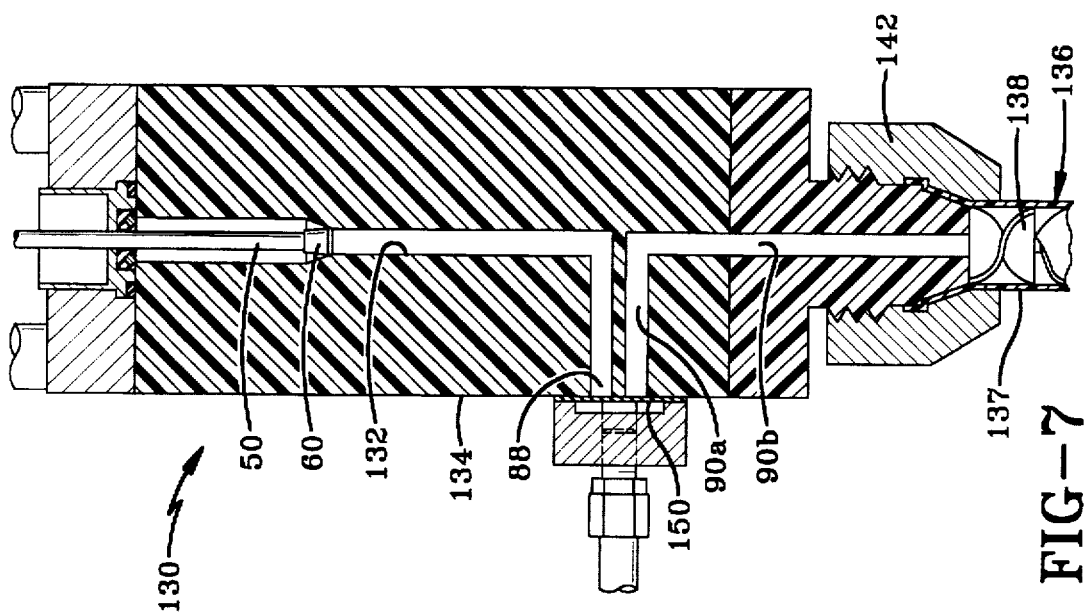
FIG. 7 is a fragmentary sectional view taken on line 7—7, FIG. 6.
Figure 6:
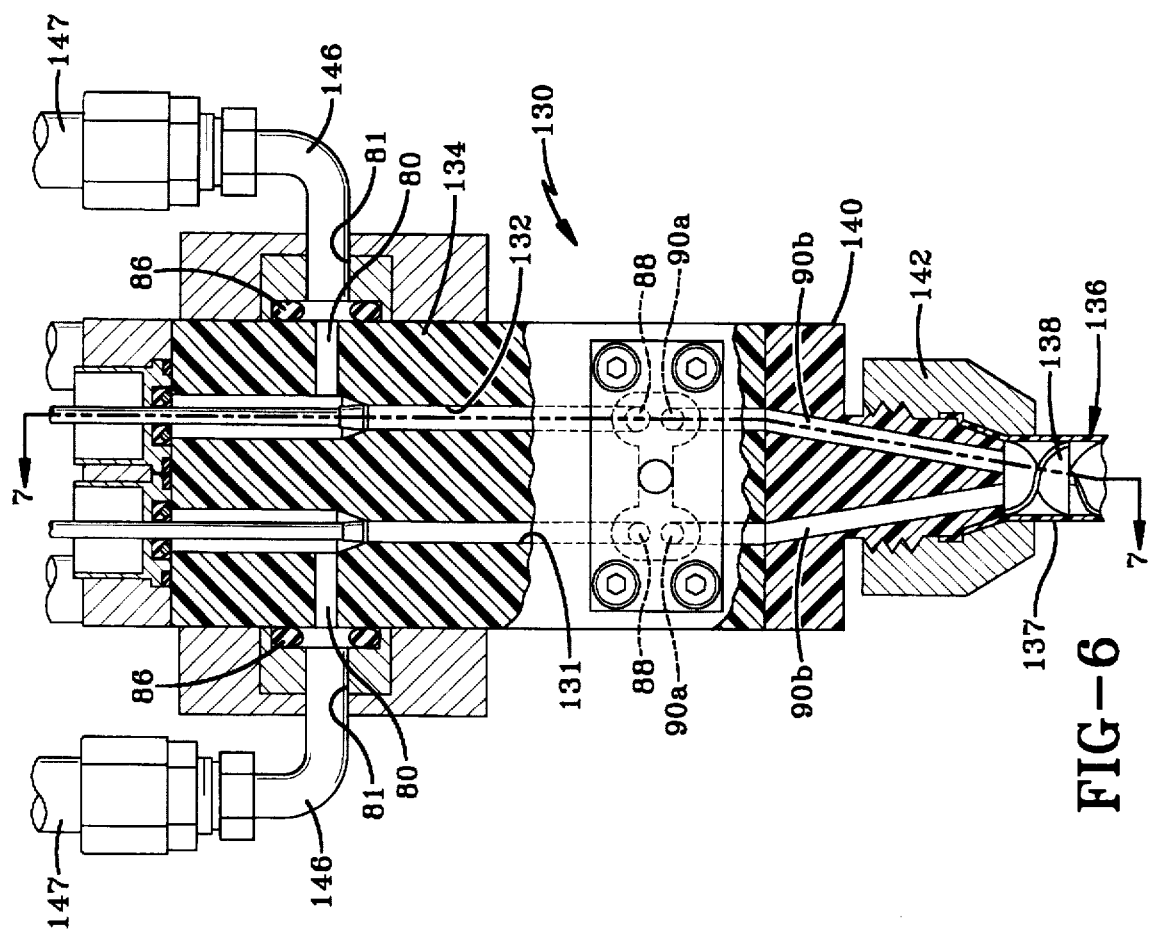
FIG. 6 is a fragmentary sectional view with portions in elevation, of a second embodiment of the invention for dispensing a two-component stream of flowable material.

In a second embodiment of the present invention, a dispenser 130, shown in FIGS. 6 and 7, includes two separate bores 131 and 132 formed in a pump cylinder 134. Dispenser 130 is similar to dispenser 1 and dispenses two separate streams of material which are subsequently joined by a disposable motionless mixer 136. Mixer 136 is formed of a plastic material and includes a helical mixing element 138 mounted in a fixed position within an outer cylindrical sleeve 137. Mixer 136 is attached to the end of a nose cap 140 by a threaded nut 142. Dispenser 130 includes a pair of elbow connectors 146 threadably engaged on one end with material inlet 80 and threadably engaged on the other end by a material supply line 147. Material supply line 147 could extend from any type of material source, such as a portable pressurized cartridge containing one of the components of a two-component liquid material, such as a reactive resin.

Dispenser 130 includes two flexible diaphragms 150 which are structurally and functionally similar to diaphragm 120 of dispenser 1. Dispenser 130 may contain only one diaphragm 150 on one pump cylinder and may include a usual spring biased check valve on the other cylinder in the event only one material being dispensed is of the anaerobic-type.

It is understood that dispenser 130 may dispense the two liquids at different ratios as desired for proper mixing and reaction. This may be accomplished by varying the diameter of bores 131 and 132, by providing separate programmable stepper motors 2 to selectively and independently drive the material from each bore 131 and 132, or by any known structures and methods well known in the dual component dispensing art.

Dispensers 1 and 130 preferably are free of metal parts which could create metal ions that contact material "M" and which can cause instant curing of the anaerobic material. Preferably most of the parts which come in contact with the material being dispensed are non-metals, such as synthetic plastics or elastomers. Pump cylinders 66, screws 61 and nozzle 94 are constructed preferably of a synthetic plastic, pistons 60 and seals 72 are constructed preferably of a flexible elastomer, and as previously mentioned flexible diaphragms 120 and 150 are constructed preferably of a ultra high molecular weight plastic, such as TEFLON. It is understood that these parts can be constructed of other non-metal materials as well, without affecting the concept of the invention.

Dispensers 1 and 130 are free of dead spots which can cause an anaerobic material to accumulate in an area devoid of oxygen and immediately cure or harden. It is understood that a lack of sufficient oxygen can cause unwanted curing of anaerobic materials and dead spots within the pump cylinder or within a usual ball-check valve are oxygen deficient and hardening of the anaerobic will occur therein.

Dispensers 1 and 130 can be used to dispense material "M" in a continuous stream or in small shot sizes of less than 1 cc. It is also understood that dispensers 1 and 130 may be driven by a pneumatic pump and stop nut as described in U.S. Pat. No. 5,092,492, or by other material displacement assemblies which selectively displaces a material from a dispenser.

Accordingly, dispensers 1 and 130 dispense flowable materials, and in particular anaerobic materials by using flexible diaphragms 120 and 150 and a supply of pressurized air applied thereon in place of a usual spring biased check valve with metal components which can cause instant curing of anaerobic materials. The dispensers use stepper motors 2 to drive leadscrews 22 which vertically displaces pistons 60. Pistons 60 force the material out of pump cylinders 66 and 134 through material passages 88. The pressure from the material flowing through material passages 88 causes diaphragms 120 and 150 to bow outwardly and permit the material to flow through the area between the inside surface of the diaphragms and the side walls of the pump cylinders. The material flows through material outlets 90 where it is dispensed through either nozzle 94 or a motionless mixer 136.

Again, the important features of the dispensers of the present invention are that diaphragms 120 and 150 are formed of a plastic which has sufficient porosity to permit oxygen to flow from the outside surface to the inside surface thereof, that the dispensers are free from metal components which can create metal ions such as by sliding friction, that can contact the anaerobic material and cause instant unwanted curing of the anaerobic material, and that the dispensers are free of dead spots which are oxygen deficient and which also can cause unwanted curing of the anaerobic material.

Accordingly, the improved dispenser is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved dispenser is constructed and used, the characteristics of the construction, and the advantageous, new and useful results obtained; the new and useful structures, devices, elements, arrangements, parts and combinations, are set forth in the appended claims.

We claim:

1. A dispenser for dispensing flowable materials including:
   a housing having an inner compartment;
   a material inlet formed in the housing for supplying the flowable material into said inner compartment;
   a material passage formed in the housing for allowing the flowable material to exit said inner compartment;
   a material outlet opening formed in the housing for allowing the flowable material to exit the dispenser;
   material displacement means for forcing the flowable material out of the inner compartment and through the material outlet opening;
   a non-metallic flexible diaphragm extending across the material passage and the material outlet and movable between an open position which allows communication between the material passage and the material outlet opening and a closed position which prevents communication between the material passage and the outlet opening, said diaphragm having inside and outside surfaces and is formed of a material which has sufficient porosity to allow oxygen to flow from its outside surface to its inside surface; and
   fluid pressure means for biasing the diaphragm toward the closed position.

2. The dispenser defined in claim 1 in which the material displacement means includes a metering rod slidably sealingly mounted within an entrance opening formed in the inner compartment and having a piston end slidably mounted within the inner compartment.

3. The dispenser defined in claim 2 in which the material displacement means further includes a motor and a ball-nut follower assembly operatively connected to the metering rod for axially moving the piston along the inner compartment.

4. The dispenser defined in claim 1 in which the material outlet opening communicates between the diaphragm and a nozzle attachment.

5. The dispenser defined in claim 1 in which the fluid pressure means for moving the diaphragm from the open position to the closed position includes an air hose which extends through an opening formed in the housing.

6. The dispenser defined in claim 1 in which the diaphragm has a nominal thickness of approximately 0.010 inches.

7. The dispenser defined in claim 1 in which a generally oval-shaped first cavity is formed in the housing; and in which said first cavity has an oval-shaped clamping surface and an oval-shaped indented central portion.

8. The dispenser defined in claim 7 in which the material outlet opening is generally L-shaped and has a substantially radially extending horizontal section and a vertically extending section; and in which the horizontal section communicates with the oval-shaped cavity.

9. The dispenser defined in claim 8 in which a first annular boss is formed around an end of the material outlet opening and a second annular boss is formed around an end of the-material passage, said bosses being formed within the indented central portion of the oval-shaped first-cavity.

10. The dispenser defined in claim 9 in which an outer housing encloses the oval-shaped cavity and flexible diaphragm and has an oval-shaped projection-which forms a second cavity which communicates with the said first cavity.

11. The dispenser defined in claim 10 in which an O-ring sits within a stepped outer end of the oval-shaped projection; and in which the O-ring and oval shaped projection sealingly engage and clamp the diaphragm against the oval-shaped clamping surface of the first cavity.

12. The dispenser defined in claim 11 in which the diaphragm extends across the first and the second bosses and the indented central portion of the first cavity to assist the diaphragm in sealing the material outlet opening and material passage.

13. An improved dispenser for dispensing flowable materials which includes a housing having an inner compartment wherein the flowable material is supplied to the inner compartment through a material inlet formed in the housing and is forced out a material outlet of the housing by a material displacement means, said improvement comprising:
   a cavity formed in the housing;
   a first material passage formed in the housing for allowing the flowable material to exit said inner compartment and flow into the cavity;
   a second material passage extending between the cavity and material outlet;
   a non-metallic flexible diaphragm mounted on the cavity and extending across the first and second material passages and movable between an open position which allows communication between the inner compartment and the material outlet and a closed position which blocks communication between said inner compartment and the material outlet, said diaphragm being formed of a plastic material having sufficient porosity to allow oxygen to flow through said diaphragm; and
   fluid pressure means for biasing the diaphragm toward the closed position.

14. The improved dispenser defined in claims 13 in which the fluid pressure means includes an air hose which provides communication between a source of pressurized air and the cavity.

15. The improved dispenser defined in claim 13 in which the cavity has a generally oval-shape and has an oval-shaped clamping surface and an oval-shaped indented central portion.

16. The improved dispenser defined in claim 15 in which a pair of bosses are located adjacent open ends of the first and second material passages, said bosses being formed within the indented central portion of the cavity.

17. The improved dispenser defined in claim 13 in which a pair of first material passages are formed in the housing for allowing the flowable material to exit said inner compartment and flow into the cavity; and in which a pair of a second material passages extend between the cavity and material outlet.

18. A dispenser for dispensing flowable materials including:
   a housing having an inner compartment;
   a material inlet formed in the housing for supplying the flowable material into said inner compartment;
   a material passage formed in the housing for allowing the flowable material to exit said inner compartment;
   a material outlet opening formed in the housing for allowing the flowable material to exit the dispenser;

material displacement means for forcing the flowable material out of the inner compartment and through the material outlet opening including a metering rod slidably sealingly mounted within an entrance opening formed in the inner compartment and having a piston end slidably mounted within the inner compartment;

a non-metallic flexible diaphragm extending across the material passage and the material outlet and movable between an open position which allows communication between the material passage and the material outlet opening and a closed position which prevents communication between the material passage and the outlet opening; and fluid pressure means for biasing the diaphragm toward the closed position.

19. The dispenser defined in claim 18 in which the diaphragm has inside and outside surfaces and is formed of a material which has sufficient porosity to allow oxygen to flow from its outside surface to its inside surface.

20. A dispenser for dispensing flowable materials including:

a housing having an inner compartment;

a material inlet formed in the housing for supplying the flowable material into said inner compartment;

a material passage formed in the housing for allowing the flowable material to exit said inner compartment;

a material outlet opening formed in the housing for allowing the flowable material to exit the dispenser;

material displacement means for forcing the flowable material out of the inner compartment and through the material outlet opening;

a non-metallic flexible diaphragm extending across the material passage and the material outlet and movable between an open position which allows communication between the material passage and the material outlet opening and a closed position which prevents communication between the material passage and the outlet opening; and fluid pressure means for biasing the diaphragm toward the closed position including an air hose which extends through an opening formed in the housing.

21. An improved dispenser for dispensing flowable materials which includes a housing having an inner compartment wherein the flowable material is supplied to the inner compartment through a material inlet formed in the housing and is forced out a material outlet of the housing by a material displacement means, said improvement comprising:

a cavity formed in the housing;

a first material passage formed in the housing for allowing the flowable material to exit said inner compartment and flow into the cavity;

a second material passage extending between the cavity and material outlet;

a non-metallic flexible diaphragm mounted on the cavity and extending across the first and second material passages and movable between an open position which allows communication between the inner compartment and the material outlet and a closed position which blocks communication between said inner compartment and the material outlet; and fluid pressure means for biasing the diaphragm toward the closed position, said fluid pressure means including an air hose which provides communication between a source of pressurized air and the cavity.

22. The improved dispenser defined in claim 21 in which the diaphragm is formed of a plastic material having sufficient porosity to allow oxygen to flow through said diaphragm.

23. The improved dispenser defined in claim 22 in which the diaphragm has a nominal thickness of approximately 0.010 inches.

* * * * *